United States Patent [19]

Gomez

[11] 3,931,074

[45] Jan. 6, 1976

[54] MODIFIERS FOR HIGH NITRILE POLYMERS

[75] Inventor: I. Luis Gomez, Longmeadow, Mass.

[73] Assignee: Monsanto Company, St. Louis, Mo.

[22] Filed: Mar. 14, 1974

[21] Appl. No.: 451,037

[52] U.S. Cl............. 260/23 R; 215/1 C; 260/31.6; 426/106
[51] Int. Cl.². ........................................ C08L 91/00
[58] Field of Search.......... 260/23 R, 31.6, 46, 879; 99/171 LP

[56] References Cited
UNITED STATES PATENTS

| | | | |
|---|---|---|---|
| 3,426,102 | 2/1969 | Solak | 260/879 |
| 3,451,538 | 6/1969 | Trementozzi | 260/879 |
| 3,479,308 | 11/1969 | Gattenby | 260/31.6 |
| 3,615,710 | 10/1971 | Lee | 206/438 |
| 3,681,275 | 8/1972 | Takeya | 260/23 R |

*Primary Examiner*—M. J. Welsh
*Attorney, Agent, or Firm*—Eugene Zagarella; William J. Farrington

[57] ABSTRACT

Disclosed herein are high nitrile polymers which have been compounded with a modifier which is a combination of (1) a $C_{12}$ to $C_{28}$ saturated aliphatic fatty acid ester of glycerol or sorbitan and (2) a polyoxyethylene sorbitan ester. The amount of modifier used is in the range of from 0.01 to 1.0 percent by weight based on the weight of the nitrile polymer. The compounded polymers exhibit lower melt viscosity and increased melt flow. The modifiers also provide improved clarity, gloss and, in certain instances, articles molded from the compounded nitrile polymer exhibit lower residual monomer levels.

21 Claims, No Drawings

MODIFIERS FOR HIGH NITRILE POLYMERS

BACKGROUND OF THE INVENTION

1. Field of the Invention

The present invention relates to high nitrile polymers which have been compounded with small amounts of a modifier which comprises a mixture of (1) a $C_{12}$ to $C_{28}$ saturated aliphatic fatty acid ester of glycerol or sorbitan; and (2) a polyoxyethylene sorbitan ester.

2. Description of the Prior Art

In recent years it has been discovered that certain high nitrile polymers are especially suitable for packaging applications because of their excellent water and oxygen barrier properties. Such polymers are described at length in U.S. Pat. Nos. 3,451,538, 3,615,710 and 3,426,102, among others.

The high nitrile polymers in molded form are shaped into various articles such as films, sheets, and containers such as bottles, jars, cans, tubs, cups, etc. Which are used for the packaging of foods, beverages, medicines, and the like.

Those skilled in the high nitrile polymer packaging art are constantly searching for ways to improve the processing properties of the polymer as well as the properties of packaging materials fabricated from the high nitrile resin. The present method provides such improvements through the use of a combination of modifiers which are compounded with the nitrile polymer.

SUMMARY OF THE INVENTION

The present invention provides high nitrile polymers which have been compounded with a combination of (1) a $C_{12}$ to $C_{28}$ saturated aliphatic fatty acid ester or glycerol or sorbitan; and (2) a polyoxyethylene sorbitan ester. The compounded high nitrile polymers, which exhibit lower melt viscosity and increased melt flow, can be extruded and molded using lower stock temperatures. In addition, articles molded from the compounded nitrile polymers exhibit improved clarity, gloss and, in certain instances, lower levels of residual monomer.

The high nitrile packaging materials used in the present invention contain from 55 to 85% by weight of a nitrile monomer unit, based on the total polymer weight, wherein the weight percent of nitrile monomer is calculated as acrylonitrile. The nitrile monomers include acrylonitrile, methacrylonitrile, ethacrylonitrile, propacrylonitrile, glutaronitrile, methyleneglutaronitrile, fumaronitrile, etc., as well as mixtures of these monomers. The preferred monomers which are interpolymerized with the nitrile monomers include aromatic monomers such as styrene and alpha-methylstyrene; lower alpha-olefins containing 2 to 6 carbon atoms such as ethylene, propylene, butylene, isobutylene, etc.; acrylic acid and methacrylic acid and the corresponding acrylate and methacrylate esters containing 1 to 4 carbon atoms such as methyl acrylate, ethyl acrylate, propyl acrylate, butyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

Optionally, the high nitrile packaging materials may contain from 0–25% by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc., which is used to strengthen or toughen the high nitrile packaging materials. This rubbery component may be incorporated into the polymeric packaging material by any of the methods which are well known to those skilled in the art, e.g., direct polymerization of monomers, grafting the nitrile monomer onto the rubber backbone, polyblend of a rubber graft polymer with a matrix polymer, etc.

The preferred nitrile polymers for those packaging applications requiring excellent oxygen and water vapor barrier properties in the packaging materials, are those nitrile polymers containing from 55 to 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from 60 to 83% by weight, whereas with methacrylonitrile the preferred range is from 70 to 98% by weight of methacrylonitrile which corresponds to about 55 to 78% by weight of nitrile monomer calculated as acrylonitrile. The preferred comonomers are styrene adn alpha-methylstyrene. Also preferred are interpolymers such as acrylonitrile/methacrylonitrile/styrene; acrylonitrile/styrene/methyl vinyl ether and acrylonitrile/styrene/ethyl vinyl ether.

The high nitrile polymer modifiers used in the present invention are a combination of a ester of glycerol or sorbitan and a polyoxyethylene sorbitan ester.

The glycerol and sorbitan esters used are the full or partial esterification products of either glycerol or sorbitan and a saturated fatty acid containing from 12 to 28 carbon atoms such as lauric, tridecylic, myristic, pentadecylic, palmitic, margaric, stearic nondecylic, arachidic, behenic, lignoceric, cerotic and montanic acids.

The preferred esters are the mono esters of glycerol and sorbitan wherein the saturated aliphatic fatty acid contains from 16 to 20 carbon atoms with glyceryl monostearate and sorbitan monostearate being especially preferred.

The polyoxyethylene sorbitan esters used are polyxoyethylene sorbitan esters of a saturated aliphatic fatty acid containing from 12 to 28 carbon atoms such as those listed above. The polyoxyethylene segment contains from 4 to 30 oxyethylene units with 16 to 24 units being preferred. The sorbitan segment used in both components is a monohydrosorbital having the general formula $C_6H_8O(OH)_4$. These materials, which are well known in the art, are derived from sorbitol by the removal of one molecule of water.

The weight ratio of the glyceryl ester or sorbitan ester to the polyoxyethylene ester used in the present invention is in the range of from 80/20 to 20/80 with a weight ratio of 70/30 to 30/70 being preferred.

The total amount of (1) the glyceryl ester or sorbitan ester, and (2) polyoxyethylene ester used in the present invention is in the range of from 0.01 to 1.0% by weight based on the weight of the nitrile polymer. Preferred amounts are in the range of from 0.01 to 0.5% by weight based on the weight of the nitrile polymer, with from 0.01 to 0.1% being especially preferred.

The following examples are set forth in illustration of the present invention and are not to be construed as a limitation thereof. All parts and percentages given are by weight unless otherwise specified.

EXAMPLES 1 – 3

These examples illustrate the lower melt viscosity that is obtained when using the modifiers of the present invention. An acrylonitrile-styrene copolymer in particulate form containing about 70% by weight of acrylonitrile and 30% by weight of styrene, is dried to a moisture content of less than 1% by weight. The copolymer is then compounded with a modifier of the present invention by blending the polymer and modifier in a high shear blender (a Welex Mixer) for 5 minutes at 3000 R.P.M. The apparent melt viscosity of the compounded polymer is then measured using a capillary rheometer at 232°C. using a shear rate of 100 sec$^{-1}$ according to the procedure set forth in ASTM D-1238. The melt viscosity of the samples tested are tabulated in Table I below:

TABLE I

| | 450°C. MELT VISCOSITY | | |
|---|---|---|---|
| Ex. | Modifier | Amount of Modifier(1) % By Weight | Apparent Melt Viscosity (K poises) |
| 1 | None — Control | None | 29 |
| 2 | { sorbitan monostearate polyoxyethylene(20) sorbitan tristearate | 0.05 0.05 | 26 |
| 3 | { glyceryl monostearate polyoxyethylene(20) sorbitan tristearate | 0.06 0.04 | 26 |

(1)based on the weight of the polymer.

The above data indicate the lower apparent melt viscosity that is achieved when the acrylonitrile polymer is compounded with the modifiers of the present invention.

EXAMPLES 4 to 14

These examples illustrate the improved intrinsic melt flow that is obtained when using the modifiers of the present invention. The high nitrile polymers used are dried and compounded as outlined in Examples 1 to 3 above. The intrinsic melt flow of the compounded samples is measured in a capillary rheometer with a 20/1 length/diameter (L/D) ratio using a force of 295 kilograms and a temperature of 233°C. using the procedure set forth in ASTM D-1238-70. The melt flow value corresponding to zero time at 233°C. is considered as the intrinsic melt flow.

The intrinsic melt flow of the samples is tabulated in Table II below.

TABLE II

| | INTRINSIC MELT FLOW | | | |
|---|---|---|---|---|
| Example | Polymer(1) | Modifier | Amount of Modifier(2) % By Weight | Intrinsic Melt Flow grams/10 Minutes |
| 4 (Control) | MAN/S | None | None | 27 |
| 5 | MAN/S | sorbitan monostearate | 0.05 | 48 |
| 6 | MAN/S | polyoxyethylene(20) sorbitan tristearate | 0.05 | 44 |
| 7 | MAN/S | { sorbitan monostearate polyoxyethylene(20) sorbitan tristearate | 0.025 0.025 | 40 |
| 8 | MAN/S | aluminum palmitate | 0.05 | 34 |
| 9 | MAN/S | stannous stearate | 0.05 | 34 |
| 10 (Control) | AN/S | None | None | 42 |
| 11 | AN/S | sorbitan monostearate | 0.05 | 61 |
| 12 | AN/S | { polyoxyethylene(20) sorbitan tristearate sorbitan monostearate | 0.03 0.02 | 64 |
| 13 | AN/S | { polyoxyethylene(20) sorbitan tristearate glyceryl monostearate | 0.021 0.039 | 61 |
| 14 | AN/S | { polyoxyethylene(20) sorbitan monolaurate glyceryl tristearate | 0.024 0.036 | 55 |

(1)MAN/S = methacrylonitrile/styrene polymer containing 90% by weight methacrylonitrile and 10% styrene.
AN/S = acrylonitrile/styrene containing 70% by weight acrylonitrile and 30% by weight styrene.
(2)based on the weight of the polymer.

The data in Table II above indicate the improved melt flow that is obtained when using the modifiers of the present invention (see Examples 7, 12, 13 and 14).

In Example 7, which uses a methacrylonitrile polymer, the intrinsic melt flow is 40 versus 27 for the Control (Example 4). When using the combination of modifiers in an acrylonitrile polymer (Examples 12 to 14) melt flow values of 64, 61 and 65 are obtained as compared with a melt flow of 42 for the Control (Example 10). In the acrylonitrile copolymer the intrinsic melt flow with a combination of modifiers is higher than that situation where sorbitan monostearate is used alone. However, Examples 5 and 6 indicate a higher melt flow in a methacrylonitrile polymer when sorbitan monostearate and polyoxyethylene(20) sorbitan tristearate are used alone as opposed to the combination used in Example 7. This seeming anomaly must be viewed in the light of the higher residual methacrylonitrile monomer content that results when sorbitan monostearate and polyoxyethylene( 20) sorbitan tristearate are used alone as opposed to the combination of these modifiers (see Table III below).

EXAMPLES 15 to 21

These examples illustrate the low level of residual monomer that is found in a methacrylonitrile/styrene polymer (90% methacrylonitrile/10% styrene) when using the modifiers of the present invention. The polymer in particulate form is blended with the various modifiers in a Welex Mixer for 5 minutes at 3000 R.P.M. The compounded polymer is then extruded into pellets which are re-extruded 4 times in a laboratory type 1¼ inch extruder having a screw with a L/D ratio of 25:1. The extrusion stock temperature of the polymer was about 238°–243°C.

The results of the extrusion runs are tabulated below in Table III.

TABLE III

SUMMARY OF EXAMPLES 15 to 21
AMOUNT OF RESIDUAL MAN MONOMER AFTER 4 PASS EXTRUSION

| Example | Modifier | Amount of Modifier % By Weight | Total Residual Monomer(1) |
|---|---|---|---|
| 15 (Control) | None | None | 898 |
| 16 | polyoxyethylene(20) sorbitan tristearate | 0.03 | 924 |
| 17 | polyoxyethylene(20) sorbitan tristearate | 0.06 | 1009 |
| 18 | sorbitan monostearate | 0.03 | 881 |
| 19 | sorbitan monostearate | 0.06 | 1374 |
| 20 | polyoxyethylene(20) sorbitan tristearate | 0.03 | 793 |
|  | sorbitan monostearate | 0.03 |  |
| 21 | polyoxyethylene(20) sorbitan tristearate | 0.024 | 746 |
|  | glyceryl monostearate | 0.036 |  |

(1)Parts per million parts of polymer(PPM)

A comparison of Examples 20 and 21, which use a combination of modifiers as taught in the present invention, with Examples 15 to 19, show the lower levels of residual methacrylonitrile (MAN) monomer which is obtained in methacrylonitrile polymers when using the modifiers of the present invention.

EXAMPLES 22 to 29

These examples illustrate the use of a conventional antioxidant in combination with a modifier of the present invention in order to obtain even lower levels of residual methacrylonitrile monomer after a 4 pass extrusion. The polymer, compound and extrusion procedure used in these examples are the same as described above in Examples 15 to 21. The antioxidant used is 2,6-tertiary butyl paracresol and it is used at a level of 0.1% by weight based on the weight of the polymer. Also included for comparison purposes are various additives conventionally used as melt processing aids in synthetic polymers. The results of these extrusion runs are tabulated in Table IV below.

TABLE IV

SUMMARY OF EXAMPLES 22 to 29
AMOUNT OF RESIDUAL MAN MONOMER AFTER 4 PASS EXTRUSION

| Example | Modifier | Amount of Modifier % By Weight | Total Residual Monomer PPM |
|---|---|---|---|
| 22 (Control) | None | None | 822 |
| 23 | polyoxyethylene(20) sorbitan tristearate | 0.03 | 582 |
|  | sorbitan monostearate | 0.03 |  |
| 24 | glyceryl monostearate | 0.1 | 639 |
| 25 | polyoxyethylene(20) stearyl ether | 0.1 | 755 |
| 26 | 4,4-thio bis(6-tert-butyl meta cresol) | 0.1 | 745 |
| 27 | 2,2'-methylene bis-(4-methyl-6-tert-butyl phenol) | 0.1 | 678 |
| 28 | mono-diglycerides of edible fats | 0.1 | 660 |
| 29 | 4,4-thio bis(6-tert-butyl meta cresol) | 0.1 | 709 |
|  | polyoxyethylene glycol | 0.2 |  |

The data in the foregoing table further illustrates the effectiveness of using a combination of modifiers as taught in the present invention in order to reduce the residual methacrylonitrile monomer in methacrylonitrile polymers.

EXAMPLES 30 to 40

Examples 30 to 40 illustrate that the modifiers of the present invention do not impart any taste to a cola beverage which is packaged in a bottle prepared from a high nitrile polymer compounded with these modifiers.

TASTE TESTS

Taste tests are conducted using 10 ounce (296 cc) bottles which are formed from a methacrylonitrile/styrene (90/10% by weight) copolymer containing various modifiers. The polymer is blended with various amounts of modifiers as outlined above, extruded into pellets and formed into 10 ounce (296 cc) bottles of the type conventionally used for soft drinks. The bottles are filled with 10 ounces (296 cc) of a well-known commercially available cola beverabe (Coca-Cola) and placed in an oven for 7 days at 38°C. along with the same beverage in a glass bottle. At the end of this period, the contents of the high nitrile bottles are poured into each of 10 unmarked vessels and the contents of the glass bottle is poured into each of 20 unmarked vessels. Five persons previously trained in taste-test techniques are chosen to act as a taste panel. Each member of the panel is given two of the vessels containing the cola beverage from the glass bottle and one vessel containing the cola beverage from the plastic bottle. The tasters do not known which one of the three vessels contain the beverage from the plastic bottle and are asked to determine whether one of the three samples has a taste different from that of the other two, and, if so, to designate which one. This is known as a "Triangle Taste Test." The test is then repeated to determine reproducibility. If a panel detects a taste difference in the beverage packaged in a high nitrile bottle, the high nitrile bottle is deemed to "fail" the taste test. The results of these tests are summarized in Table V below.

TABLE V

SUMMARY OF TASTE TESTS

| Example | Modifier | Amount of Modifier(1) | Taste Test |
|---|---|---|---|
| 30 | N,N-distearyl ethylene diamine | 0.25 | Fail |
| 31 | sorbitan tristearate | 0.5 | Pass |
| 32 | polyoxyethylene(20) sorbitan monolaurate | 0.5 | '' |
| 33 | polyoxyethylene(20) sorbitan tristearate | 0.5 | '' |
| 34 | polyoxyethylene(4) sorbitan monostearate | 0.5 | '' |
| 35 | polyoxyethylene(8) stearate | 0.5 | Fail |
| 36 | polyoxyethylene(2) cetyl ether | 0.5 | '' |
| 37 | glyceryl monostearate | 0.5 | Pass |
| 38 | polyoxyethylene(20) sorbitan monolaurate | 0.5 | Fail |
|  | polyoxyethylene glycol | 0.5 |  |
| 39 | polyoxyethylene(20) sorbitan tristearate | 0.5 | Pass |
|  | glyceryl monostearate | 0.5 |  |
| 40 | polyoxyethylene(20) sorbitan tristearate | 0.5 | Pass |
|  | sorbitan monostearate | 0.5 |  |

(1)based on the weight of the polymer.

The data in the above Table V illustrate that the modifiers of the present invention impart no taste to a cola beverage packaged in a high nitrile polymer which has been compounded with the modifiers of the present invention.

Examples 39 and 40 were repeated except using a copolymer of acrylonitrile and styrene containing 70% acrylonitrile and 30% styrene. Comparable results were obtained.

EXAMPLE 41

In this example an acrylonitrile/styrene copolymer containing 70% by weight of acrylonitrile is compounded with green pigment and 0.03% by weight of a 40/60% by weight mixture of polyoxyethylene(20) sorbitan tristearate and glyceryl monostearate. The resulting composition is formed into 10 ounce (296 cc) bottles. The bottles are examined visually and found to have better color, gloss and clarity as compared to control bottles which did not contain the modifiers of the present invention.

EXAMPLE 42

Example 41 is repeated here except sorbitan monostearate is used in place of the glyceryl monostearate used in Example 41. Comparable results are obtained.

The present invention also contemplates the use of other additives and ingredients in the polymeric composition which do not adversely effect the taste properties of the resulting packaging materials. Examples of these ingredients include thermal stabilizers, light stabilizers, dyes, pigments, plasticizers, fillers, antioxidants, etc.

It is obvious that many variations may be made in the products and processes set forth above without departing from the spirit and scope of this invention.

What is claimed is:

1. A nitrile polymer which has been compounded with a modifier which is a combination of (1) a $C_{12}$ to $C_{28}$ saturated aliphatic fatty acid ester of a compound selected from the group consisting of glycerol and sorbitan; and (2) a polyoxyethylene sorbitan ester of a $C_{12}$ to $C_{28}$ saturated fatty acid, wherein the polyoxyethylene contains from 4 to 30 oxyethylene units; wherein the weight ratio of component (1) to component (2) is in the range of from 80/20 to 20/80; and wherein the amount of modifier used is in the range of from 0.01 to 1.0% by weight based on the weight of the nitrile polymer.

2. A nitrile polymer as in claim 1 which contains 55 to 85% by weight of a nitrile monomer selected from the group consisting of acrylonitrile and methacrylonitrile, wherein the weight of the methacrylonitrile is calculated as acrylonitrile.

3. A nitrile polymer as in claim 2 wherein the amount of modifier used is in the range from 0.01 to 0.5% by weight.

4. A nitrile polymer as in claim 2 wherein the amount of modifier used is in the range from 0.01 to 0.1% by weight.

5. A nitrile polymer as in claim 2 wherein the saturated aliphatic fatty acids used in components (1) and (2) contains from 16 to 20 carbon atoms.

6. A nitrile polymer as in claim 2 wherein the saturated aliphatic fatty acids used in components (1) and (2) is stearic acid.

7. A nitrile polymer as in claim 2 wherein the polyoxyethylene segment contains 16 to 24 oxyethylene units.

8. An acrylonitrile polymer containing from 60 to 83% by weight of acrylonitrile which has been compounded with a modifier which is a combination of (1) a $C_{16}$ to $C_{20}$ saturated aliphatic fatty acid ester of a compound selected from the group consisting of glycerol and sorbitan; and (2) a polyoxyethylene sorbitan ester of a $C_{16}$ to $C_{20}$ saturated fatty acid, wherein the polyoxyethylene contains from 16 to 24 oxyethylene units, wherein the weight ratio of component (1) to component (2) is in the range of from 80/20 to 20/80; and wherein the amount of modifier used is in the range from 0.01 to 0.5% by weight based on the weight of the acrylonitrile polymer.

9. An acrylonitrile polymer as in claim 8 wherein the saturated aliphatic fatty acids used in components (1) and (2) is stearic acid.

10. An acrylonitrile polymer as in claim 8 wherein the polyoxyethylene ester is polyoxyethylene(20) sorbitan tristearate.

11. An acrylonitrile polymer as in claim 8 wherein the modifier is a combination of (1) glyceryl monostearate and (2) polyoxyethylene(20) sorbitan tristearate.

12. An acrylonitrile polymer as in claim 8 wherein the modifier is a combination of (1) sorbitan monostearate and polyoxyethylene(20) sorbitan tristearate.

13. An acrylonitrile polymer containing from 60 to 83% by weight of acrylonitrile which has been compounded with a modifier which is a combination of (1) a compound selected from the group consisting of glyceryl monostearate and sorbitan monostearate; and (2) polyoxyethylene(20) sorbitan tristearate; wherein the weight ratio of component (1) to component (2) is in the range of from 80/20 to 20/80; and wherein the amount of modifier used is in the range from 0.01 to 0.5% by weight based on the weight of the acrylonitrile polymer.

14. An acrylonitrile polymer as in claim 13 wherein the amount of modifier used is in the range from 0.01 to 0.1% by weight.

15. An acrylonitrile polymer as in claim 13 which is rubber modified.

16. A nitrile polymer as in claim 2 wherein styrene is added as a copolymer.

17. A molded container formed from the nitrile polymer of claim 1.

18. The molded container of claim 17 wherein the container is in the form of a bottle.

19. A molded container formed from the nitrile polymer of claim 8.

20. The molded container of claim 19 wherein the container is in the form of a bottle.

21. A molded container formed from the nitrile polymer of claim 16.

* * * * *